(12) United States Patent
Khieu et al.

(10) Patent No.: US 9,837,001 B2
(45) Date of Patent: Dec. 5, 2017

(54) SIGNAGE OVERLAY ARTICLE

(71) Applicant: 3M INNOVATIVE PROPERTIES COMPANY, St. Paul, MN (US)

(72) Inventors: Sithya S. Khieu, Eden Prairie, MN (US); David C. May, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/653,908

(22) PCT Filed: Mar. 13, 2013

(86) PCT No.: PCT/US2013/030914
§ 371 (c)(1),
(2) Date: Jun. 19, 2015

(87) PCT Pub. No.: WO2014/098940
PCT Pub. Date: Jun. 26, 2014

(65) Prior Publication Data
US 2015/0348454 A1  Dec. 3, 2015

Related U.S. Application Data

(60) Provisional application No. 61/740,635, filed on Dec. 21, 2012.

(51) Int. Cl.
| | | |
|---|---|---|
| *G09F 13/16* | (2006.01) | |
| *G02B 5/124* | (2006.01) | |
| *B32B 5/32* | (2006.01) | |
| *B32B 15/04* | (2006.01) | |
| *B32B 15/20* | (2006.01) | |
| *B32B 27/06* | (2006.01) | |

(Continued)

(52) U.S. Cl.
CPC ............. *G09F 13/16* (2013.01); *B32B 3/266* (2013.01); *B32B 5/32* (2013.01); *B32B 15/046* (2013.01); *B32B 15/20* (2013.01); *B32B 27/065* (2013.01); *B32B 27/304* (2013.01); *B32B 27/36* (2013.01); *G02B 5/124* (2013.01); *B32B 2266/0242* (2013.01); *B32B 2266/0264* (2013.01); *B32B 2266/08* (2013.01); *B32B 2307/416* (2013.01); *B32B 2590/00* (2013.01); *Y10T 428/24802* (2015.01); *Y10T 428/24967* (2015.01)

(58) Field of Classification Search
CPC ...................................................... G09F 13/16
See application file for complete search history.

(56) References Cited

U.S. PATENT DOCUMENTS 4,983,436 A * 1/1991 Bailey ................. B32B 27/08
359/538
5,272,562 A * 12/1993 Coderre ................ G02B 5/124
359/529

(Continued)

FOREIGN PATENT DOCUMENTS

| GB | 2 319 386 | 5/1998 |
| WO | WO 86-04547 | 8/1986 |

*Primary Examiner* — Gary C Hoge

(57) ABSTRACT

A signage overlay article includes a polymeric substrate having a thickness in a range from 75 to 1000 micrometers, an optically active sign sheeting fixed to the polymeric substrate, and a pressure sensitive adhesive layer adhered to the polymeric substrate. The pressure sensitive adhesive layer has a thickness in a range from 350 to 3000 micrometers.

14 Claims, 1 Drawing Sheet

(51) Int. Cl.
B32B 27/30 (2006.01)
B32B 27/36 (2006.01)
B32B 3/26 (2006.01)

(56) References Cited

U.S. PATENT DOCUMENTS

| | | | | |
|---|---|---|---|---|
| 5,415,911 | A * | 5/1995 | Zampa | B32B 37/12 |
| | | | | 359/529 |
| 6,461,709 | B1 * | 10/2002 | Janssen | B32B 7/06 |
| | | | | 156/297 |
| 6,470,610 | B1 * | 10/2002 | Northey | G02B 5/124 |
| | | | | 359/530 |
| 6,677,028 | B1 * | 1/2004 | Lasch | B32B 27/40 |
| | | | | 359/529 |
| 7,716,862 | B2 * | 5/2010 | Blanchard | G09F 7/00 |
| | | | | 40/594 |
| 7,877,912 | B1 * | 2/2011 | Ley-Owens | G09F 13/16 |
| | | | | 40/582 |
| 7,992,917 | B2 * | 8/2011 | McCormick | B32B 17/10009 |
| | | | | 296/95.1 |
| 2003/0049415 | A1 | 3/2003 | Pedginski et al. | |
| 2003/0112311 | A1 | 6/2003 | Naik et al. | |
| 2004/0119804 | A1 | 6/2004 | Emslander et al. | |
| 2005/0284011 | A1 | 12/2005 | Todd | |
| 2009/0310209 | A1 * | 12/2009 | Aschwanden | G02B 5/1828 |
| | | | | 359/291 |
| 2010/0233505 | A1 * | 9/2010 | Boger | B29C 44/326 |
| | | | | 428/613 |
| 2010/0299984 | A1 | 12/2010 | Khieu et al. | |
| 2011/0033696 | A1 * | 2/2011 | Grubish | B32B 37/0015 |
| | | | | 428/334 |

* cited by examiner

SIGNAGE OVERLAY ARTICLE

FIELD

The disclosure relates to signage overlay articles and particularly to signage overlay articles that include a polymeric substrate and a thick pressure sensitive adhesive layer for adhesion to a sign blank.

BACKGROUND

Traffic signs are generally constructed by application of a polymeric retroreflective film to a sign substrate. The retroreflective film is processed through a variety of means to produce an image on the surface to communicate a message to a driver.

The substrate is frequently produced from either aluminum sheet goods or extrusion to provide a durable and stable sign. The substrate is designed to with stand the forces from wind and debris that result from exterior exposure along roadways. Aluminum is a common choice for this purpose due to its resistance to corrosion, light weight and high strength. Under normal circumstances the aluminum sign substrate will last much longer than the polymeric materials used to produce the retroreflective film and image.

Replacement of the sign requires that the sign be removed from the support structure and returned to a storage facility. Often when signs are replaced the substrate is in good, serviceable condition while the retroreflective sheeting has deteriorated due to natural weathering or acts of vandalism. This can occur anywhere from a few months to twenty years from the initial installation. The aluminum substrate is either discarded or recycled by removal of the retroreflective film, cleaning and reapplication of new film. The replacement process is both time consuming and disruptive to traffic. This is particularly a problem on large overhead or shoulder mounted guide signs. Signs of this type require closure of a portion of the road to allow use of powered lifting equipment to remove and replace the sign.

These large format guide signs may also be refurbished by overlaying the sign face with sheet aluminum that has the retroreflective sheeting and image pre-applied. Typically these are attached to the existing substrate by use of mechanical fasteners such as rivets or bolts. These overlays are heavy and require the use of specialized lifting equipment.

Attempts to refurbish existing signs using light weight materials have consisted of thin aluminum foil or flexible sign films that are placed over the existing sign face. The foil materials are adhered to the sign face by use of conventional pressure sensitive adhesives. The flexible sign faces are adhered to the sign by use of a frame binding the film to the sign substrate. Neither of these methods has proven to be acceptable to highway maintenance personnel. While light in weight, both approaches make use of thin flexible materials that are difficult to handle in outdoor environments.

Conventional retroreflective sheeting can be applied to refurbish signs. However, the difference in coefficient of thermal expansion between the aluminum and polymeric sheeting can result in partial de-lamination or "pillowing" effect. On signs where the maximum dimension is greater than about 36 inches it becomes very difficult to apply conventional materials without creating wrinkles or trapping air resulting, which results in unacceptable appearance of the sign.

BRIEF SUMMARY

The disclosure relates to signage overlay articles and particularly to signage overlay articles that include a polymeric substrate and a thick pressure sensitive adhesive (i.e., PSA) layer for adhesion to a sign blank. The thick PSA layer and the polymeric substrate components result in generating a compliant layer that allows sufficient movement at the interface of the aluminum sign blank or sign panel and polymeric substrates to prevent de-lamination or distortion that appears as a result of pillowing.

In a first aspect of the disclosure, a signage overlay article includes a polymeric substrate having a first major front surface and an opposing second major rear surface, an optically active sign sheeting fixed to the first major front surface of the polymeric substrate and a pressure sensitive adhesive layer adhered to the second major rear surface of the polymeric substrate. The polymeric substrate has a thickness in a range from 75 to 1000 micrometers. The pressure sensitive adhesive layer has a thickness in a range from 350 to 3000 micrometers.

In a second aspect of the disclosure, a sign includes a sign blank or sign panel having a front sign surface and a signage overlay article, as described herein, adhered to the sign blank via the pressure sensitive adhesive layer.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
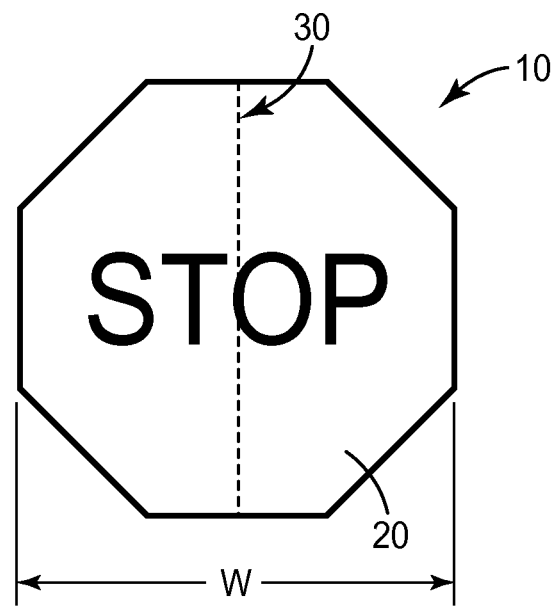
FIG. 1 is a schematic front view of an illustrative signage overlay article.

In the following detailed description, reference is made to the accompanying drawings that form a part hereof; and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on", "connected to," "coupled with", "in contact with", "separating" or "adjacent" another element, component or layer, it can be directly on, directly connected to, directly coupled with, in direct contact with, or intervening elements, components or layers may be on, connected, coupled or in contact with or separating the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The term "sign blank" refers to a rigid substrate suitable for mounting in the intended end use application.

The term "sign panel" refers to a sign blank with at least one retroreflective sheeting laminated to at least one face or major surface. A sign panel may additionally include one or more layers of an overlay article attached to the retroreflective sheeting. A sign panel without a laminated retroreflective sheeting is referred to as a sign blank.

The disclosure relates to, signage overlay articles and particularly to signage overlay articles that include a polymeric substrate and a thick pressure sensitive adhesive (i.e., PSA) layer for adhesion to a sign blank or sign panel, among other aspects. The thick PSA layer and the polymeric substrate components result in generating a compliant layer that allows sufficient movement at the interface of the aluminum sign blank and polymeric substrates to prevent de-lamination or distortion that appears as pillowing. In addition, the signage overlay article can include a hinge element for application of overlays that are greater than 48 inches in width to improve handling. While the present disclosure is not so limited, an appreciation of various aspects of the disclosure will be gained through a discussion of the examples provided below.

Figure 2:
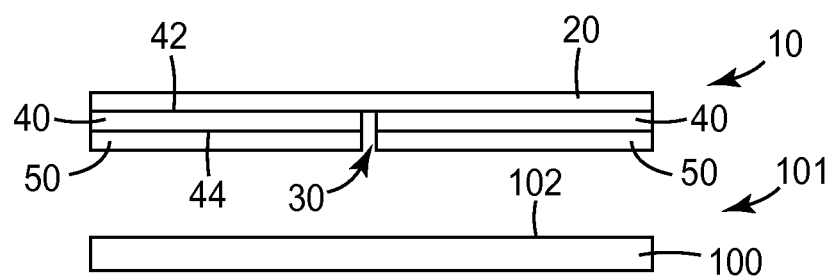
FIG. 2 is a schematic cross-sectional view of an illustrative signage overlay article on top of a sign blank or sign panel.

FIG. 1 is a schematic front view of an illustrative signage overlay article 10. FIG. 2 is a schematic cross-sectional view of an illustrative signage overlay article 10 on a sign blank or sign panel 100.

In one or more embodiments a signage overlay article 10 includes a polymeric substrate 40 having a first major front surface 42 and an opposing second major rear surface 44, an optically active sign sheeting 20 fixed to the first major front surface 42 of the polymeric substrate 40 and a pressure sensitive adhesive layer 50 adhered to the second major rear surface 44 of the polymeric substrate 40.

In one or more embodiments a sign 101 includes a sign blank 100 having a front sign surface 102 and a signage overlay article 10 adhered to the sign blank 100 via the pressure sensitive adhesive layer 50. The signage overlay article 10 is described herein. In many embodiments, the sign blank 100 is formed of a rigid substrate such as aluminum, sandwich composites, wood or polymer.

The front sign surface 102 can be a major surface of the rigid substrate such as an aluminum surface for a sign blank. The front sign surface 102 can be a major surface of an existing optically active sign sheeting or retroreflective sign sheeting surface for a sign panel where the existing optically active sign sheeting or retroreflective sign sheeting is fixed to a major surface of the rigid substrate such as an aluminum surface of the sign blank. In many of these embodiments, the optically active sign sheeting or retroreflective sign sheeting is no longer optically active or retroreflective or these properties have been degraded to the point that these used signs need to be re-surfaced with the signage overlay article described herein.

In one or more embodiments a sign 101 includes a sign panel 100 having a front sign surface 102 that includes an existing optically active sign sheeting and a signage overlay article 10 adhered to the sign panel 100 existing optically active sign sheeting via the pressure sensitive adhesive layer 50. The signage overlay article 10 is described herein and can be utilized to re-face an existing sign. In many embodiments, the sign blank 100 is formed of a rigid substrate such as aluminum, sandwich composites, wood or polymer. In many embodiments, the sign blank or sign panel 100 has a lateral dimension W that is greater than 0.5 meter or greater than 1 meter. In these applications, the signage overlay article 10 is described herein with a hinge element (described below) is especially useful.

In one or more embodiments the optically active sign sheeting 20 is a retroreflective sheeting. Suitable retroreflective sheeting is commercially available under the trade designation Diamond Grade from 3M Company, St. Paul, Minn. In alternate embodiments the sign sheeting is not optically active or not retroreflective. Letters, symbols or other indicia may or may not be included on the sign sheeting 20.

In one or more embodiments the polymeric substrate 40 is a flexible or semi-rigid element. In many embodiments the polymeric substrate 40 is formed from a polyester material or vinyl (PVC) material, for example. In many embodiments the polymeric substrate 40 is a foamed material such as a foamed polyester material. The polymeric substrate 40 can have any useful thickness such as a thickness in a range from 75 to 1000 micrometers, for example.

In some embodiments the polymeric substrate 40 is a foamed polymer material such as a foamed polyester (PET) material having a thickness in a range from to 600 to 1000 micrometers. In some embodiments, the polymeric substrate 40 is a polyester (PET) material having a thickness in a range from 200 to 500 micrometers. In some embodiments, the polymeric substrate 40 is a rigid vinyl (PVC) material having a thickness in a range from 200 to 800 micrometers. Surprisingly the foamed polyester material having a thickness in a range from to 600 to 1000 micrometers provided superior handling results. Suitable foamed polyester (PET) substrates are commercially available from MicroGreen Polymers Inc., Arlington, Wash.

In one or more embodiments the pressure sensitive adhesive layer 50 is a closed foam pressure sensitive adhesive material. In many embodiments the pressure sensitive adhesive layer 50 is an acrylic foam pressure sensitive adhesive material. Suitable acrylic foam pressure sensitive adhesives are commercially available under the trade designation VHB Tapes from 3M Company, St. Paul, Minn. It has been found that providing a suitably thick layer of PSA material, described above, can provide a sufficient compliant layer to allow sufficient movement at the interface of the aluminum sign panel and polymeric substrates to prevent de-lamination or distortion that appears as pillowing. Suitably thick PSA layer is also determined to be useful for covering the rivet heads and rivet holes for demountable copy signs by providing a mechanism to fix the retroreflective surface distortion. In many embodiments the pressure sensitive adhesive layer 50 has a thickness in a range from 350 to 3000 micrometers or from to 400 to 2000 micrometers.

On signs which require application of overlays greater than 48 inches (or one meter) in width the signs are created by "tiling" together multiple printed sheets. This calls for accurate alignment of adjacent sheets. Accomplishing this in a field application requires an overlay that is resistant to wind and easily aligned before removal of the adhesive liner. Once the liner is removed the overlay is adhered to the existing sign face and no further alignment is usually possible. As the size of the overlay increases it becomes increasingly difficult to remove the liner and laminate to the existing sign without trapping air under the adhesive. Alignment of adjacent "tiles" can be time consuming and tedious. It is therefore desirable to have the "tile" size as large as possible to facilitate efficient sign face installation. It has been found that a width of about 24 inches (or 0.5 meter) may be handled for field fabrication of signs however this requires more "tiling" than desirable. Surprisingly it was found that folding a 48" overlay (or one meter) along a preformed "hinge" greatly improves the handling of a sign overlay while eliminating the number of "tiles" needed to complete the sign face. Folding the overlay increases the apparent stiffness of the film to improve handling and alignment. Further it permits use of clamping once the overlay is aligned. The overlay is then folded back along the "hinge" line, liner removed and the overlay laminated to the sign in a width of 24 inches or less (or 0.5 meter or less). The clamping is removed and then the process is repeated for the remaining portion of the overlay. The process may then be repeated to create a sign of any width required.

In one or more embodiments a hinge element 30 is formed within the signage overlay article 10. The hinge element 30 is useful for signage overlay article 10 having a lateral dimension of 0.5 meter or greater. The hinge element 30 can be formed in any useful way. In many embodiments the hinge element 30 is defined by a gap through the pressure sensitive adhesive layer 50, and the optically active sign sheeting 20 spanning the gap 30 and holding the signage overlay article 10 together. In some embodiments the hinge element 30 is defined by a gap through the pressure sensitive adhesive layer 50, and a gap in the polymeric substrate 40, where the optically active sign sheeting 20 spans the gap 30 separating the pressure sensitive adhesive layer 50 and the gap in the polymeric substrate 40, and the optically active sign sheeting 20 holding the signage overlay article 10 together. In other embodiments the hinge element 30 is defined by a gap through the pressure sensitive adhesive layer 50 and a crease in the polymeric substrate 40, and the optically active sign sheeting 20 spans the gap 30 and crease in the polymeric substrate 40 and the optically active sign sheeting 20 along with the crease in the polymeric substrate 40 holds the signage overlay article 10 together.

Some of the advantages of the disclosed constructions are further illustrated by the following examples. The particular materials, amounts and dimensions recited in this example, as well as other conditions and details, should not be construed to unduly limit the present disclosure.

EXAMPLES

Samples were prepared in the following manner: 3M brand VHB tapes were applied to each reinforcing substrate sample by hand followed by application of pressure using a pneumatic nip roll. To the opposite side of the reinforcing substrate a retroreflective sheeting commonly used for traffic signs was laminated using the pressure sensitive adhesive as supplied from 3M. The entire construction was then again passed through the nip roll. These samples were evaluated for handling and ease of application to an existing traffic sign.

In general the more rigid the construction, the easier it is to handle in outdoor conditions however, the overall weight, conformability and adhesive tack also impact handling during application. Balancing these properties is not as simple as matching the "right" reinforcing layer to particular adhesive. More rigid reinforcing layers tend to reduce conformability. Lower conformability requires a more aggressive adhesive or higher application pressure. More aggressive adhesives are more difficult to apply without creating wrinkles and air entrapment.

Samples produced using a reinforcing layer of calendered sheet PVC in thickness less than about 0.024 inches were deemed to be too flexible for field application. Samples produced with sheet PVC greater than about 600 micrometers were of sufficient stiffness to handle outdoors.

Samples produced using a heat set PET at 0.012 inches were found to be comparable in stiffness to the 0.024 inch PVC. This is undoubtedly due to the higher modulus of the PET. Conformability remains a concern as the sample resists conformance and tends to lift in areas where the sign substrate is irregular.

Microcellular PET at a thickness of 900 micrometers is comparable in weight to the heat set PET. The samples produced using this as a reinforcing layer were similar in handling (rigidity) to that of the 900 micrometer PVC construction. The microcellular structure however, greatly improved conformance while reducing weight and lifting over irregularities.

3M's VHB adhesive tapes cover a wide range of properties. The specific tape selected will depend upon the sign substrate, temperature of application and conformability of the construction selected. In general we have found the VHB 4926 and 5915 to be useful for a variety of substrates. Both tapes have a low initial tack to allow easier application.

Folding the construction along a formed hinge line improves the field handling of flexible constructions. This allows use of thinner and potentially lighter constructions.

We form the hinge in the retroreflective sheeting prior to application of the reinforcing layer. The hinge is formed by application of heat and pressure to the front of the retroreflective sheeting to create a crease for the fold. In a manufacturing environment a pair of matched dies can be used to create the crease.

The reinforcing layer+VHB tape is then aligned along the crease on the back of the retroreflective sheeting. The liner is removed from the retroreflective sheeting to expose the adhesive for lamination of the reinforcing layer. This is repeated on the other side of the crease to complete to construction.

One advantage of the microcellular PET is that is does not require two separate pieces along the crease. The microcellular compresses in the area of the hinge when folded without distortion of the retroreflective sheeting. (This requires an extensible liner for the VHB tape).

What is claimed is:

1. A signage overlay article comprising:
   a polymeric substrate having a first major front surface and an opposing second major rear surface, the polymeric substrate having a thickness in a range from 75 to 1000 micrometers;
   an optically active sign sheeting fixed to the first major front surface of the polymeric substrate; and
   a pressure sensitive adhesive layer adhered to the second major rear surface of the polymeric substrate, the pressure sensitive adhesive layer having a thickness in a range from 350 to 3000 micrometers.

2. A signage overlay article according to claim 1, wherein the polymeric substrate comprises a foamed polymer material.

3. A signage overlay article according to claim 1, wherein the polymeric substrate comprises a polyester material.

4. A signage overlay article according to claim 3, wherein the polyester material has a thickness in a range from to 600 to 1000 micrometers.

5. A signage overlay article according to claim 1, wherein the pressure sensitive adhesive layer has a thickness in a range from to 400 to 2000 micrometers.

6. A signage overlay article according to claim 1, wherein the pressure sensitive adhesive layer comprises a closed foam pressure sensitive adhesive material.

7. A signage overlay article according to claim 1, wherein the pressure sensitive adhesive layer comprises acrylic foam pressure sensitive adhesive material.

8. A signage overlay article according to claim 1, wherein the signage overlay article has a lateral dimension that is greater than 0.5 meters.

9. A signage overlay article according to claim 8, further comprising a hinge element formed within the signage overlay article, the hinge element defined by a gap through the pressure sensitive adhesive layer, and the optically active sign sheeting spanning the gap and holding the signage overlay article together.

10. The signage overlay article according to claim 1, wherein the optically active signs sheeting is a retroreflective sheeting.

11. A sign, comprising;
    a sign blank or sign panel having a front sign surface; and
    a signage overlay article according to any of the preceding claims adhered to the sign blank or sign panel via the pressure sensitive adhesive layer.

12. A sign according to claim 11, wherein the sign blank or sign panel comprises aluminum.

13. A sign according to claim 11, wherein the signage overlay article is directly adhered to the sign blank or sign panel front sign surface via the pressure sensitive adhesive layer.

14. A sign according to claim 11, wherein the sign panel has a lateral dimension that is greater than 0.5 meter.

* * * * *